(12) United States Patent
Salerno, Jr.

(10) Patent No.: US 11,066,191 B2
(45) Date of Patent: Jul. 20, 2021

(54) SYSTEM AND METHOD FOR DETECTING SUBSTANCES FROM SPECTRAL SIGNATURES

(71) Applicant: BAE Systems Information and Electronic Systems Integration Inc., Nashua, NH (US)

(72) Inventor: John A. Salerno, Jr., Sherrill, NY (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 0 days.

(21) Appl. No.: 16/758,294

(22) PCT Filed: Oct. 26, 2017

(86) PCT No.: PCT/US2017/058411
§ 371 (c)(1),
(2) Date: Apr. 22, 2020

(87) PCT Pub. No.: WO2019/083533
PCT Pub. Date: May 2, 2019

(65) Prior Publication Data
US 2020/0317373 A1 Oct. 8, 2020

(51) Int. Cl.
*B64G 1/10* (2006.01)
*G01N 21/35* (2014.01)

(52) U.S. Cl.
CPC .......... *B64G 1/1021* (2013.01); *G01N 21/35* (2013.01)

(58) Field of Classification Search
CPC .............................. B64G 1/1021; G01N 21/35

USPC .......... 348/144, 162, 164; 250/330, 339.07; 382/100
See application file for complete search history.

(56) References Cited

U.S. PATENT DOCUMENTS

| | | | |
|---|---|---|---|
| 7,764,810 B2 * | 7/2010 | Rahmes ................ | G06T 17/05 382/109 |
| 8,189,860 B2 * | 5/2012 | Thyagarajan ........ | G06K 9/4652 382/100 |
| 10,234,377 B1 * | 3/2019 | Owechko ................ | G01J 3/28 |

(Continued)

OTHER PUBLICATIONS

International Search Report, PCT/US17/58411, dated Jan. 12, 2018, 14 pages.

(Continued)

*Primary Examiner* — Thai Q Tran
*Assistant Examiner* — Stephen R Smith
(74) *Attorney, Agent, or Firm* — Scott J. Asmus; Sand, Sebolt & Wernow LPA

(57) ABSTRACT

A system and method for detecting or identifying substances based on spectral response signatures is provided. The system utilizes IR imagery, singularly or stored in a database, in operative communication with a database or library of known spectral response signatures. The system correlates the spectral response signature detected, or inherent, in an image or image library, with the set of known signatures in the spectral database. The system generates a report of the substances or chemical compounds present in at least a portion of the image. The system can also query a database of IR products for an area of interest, and return results in a report or via an interactive tool, for IR products containing specific IR spectral results.

20 Claims, 4 Drawing Sheets

(56) References Cited

U.S. PATENT DOCUMENTS

| | | | | |
|---|---|---|---|---|
| 2008/0021657 A1* | 1/2008 | Barkal | ............... | G01V 1/008 |
| | | | | 702/14 |
| 2009/0232349 A1* | 9/2009 | Moses | ............... | G06T 5/006 |
| | | | | 382/100 |
| 2013/0341509 A1* | 12/2013 | Nelson | ............... | G01J 3/2823 |
| | | | | 250/330 |
| 2016/0356650 A1* | 12/2016 | Zhang | ............... | G01J 3/0208 |

OTHER PUBLICATIONS

Digital Globe webinar "Capitalize on WorldView-3 SWIR Data with ENVI". Found at URL: http://www.digitalglobe.com/webinars.

USGS Spectral Library 06, URL: http://speclab.cr.usgs.gov/spectral-lib.html.

\* cited by examiner

*

SYSTEM AND METHOD FOR DETECTING SUBSTANCES FROM SPECTRAL SIGNATURES

TECHNICAL FIELD

The present disclosure relates generally to a system and method for locating one or more objects based on the object's infrared signature contained in the metadata of the imagery product. More particularly, the present disclosure relates to systems and methods for determining objects or materials near the ground surface based on spectral response graphs obtained from metadata within infrared images. Specifically, the present disclosure relates to locating points of interest (targets, objects, or materials) on a per product, per band basis by querying a database of spectral signatures.

Background Information

As is well known, the visible light spectrum comprises wavelengths of approximately 400 nm to 700 nm. The color of an object corresponds to the wavelength of light it reflects and identifies something about that object. If an object is white, it indicates that it reflects all wavelengths of visible light. If it is black, it absorbs all wavelengths of visible light. If the color is green or red, or another color, it indicates that object reflects that color (or wavelength) of light, and absorbs the other colors.

In the same way that a material reflects or absorbs visible light, it also reflects or absorbs light in other non-visible wavelengths. The absorption and reflection patterns of Short Wave Infrared (SWIR), wavelengths in the range of 1400 to 3000 nm, are particularly useful in determining the chemical makeup of materials. Most compounds have a unique spectra signature analogous to a human finger print. If a spectral signature is present, so is that compound or material.

Surveillance has always been a critical aspect of counterintelligence and countermeasure systems. More particularly, quality surveillance enables targets to be identified, such as points of interest. The identified targets may then be utilized and exploited in order to provide intelligence as to the types of targets or the points of interest.

Currently, satellites carry infrared (IR) sensors that are used to obtain images for various reasons. Some satellites carrying IR sensors to capture IR satellite imagery are wildfire response, food security, and mining and geology applications. As IR imagery and IR sensor technology continues to improve, a significant amount of metadata is included in the IR images captured by the high-resolution infrared image sensors.

Currently, many sensors produce imagery that includes eight bands of information in the IR spectrum; however, there is not a product that is able to query a database for imagery that contains a specific spectral signature for a designated area of interest.

SUMMARY

Until recently, imagery products did not have band information accurate enough to perform detailed spectral analysis in the SWIR range. In some SWIR products, there is now sufficient band information to do this analysis. The present disclosure addresses some issues pertaining the spectral analysis in the SWIR range of IR imagery capture from a satellite.

In one aspect, an exemplary embodiment of the present disclosure may provide a system for detecting a substance from infrared imagery comprising: at least one non-transitory computer readable storage medium having instructions encoded thereon that, when executed by at least one processor, implement operations to detect a substance or chemical compound from a spectral response signature contained in infrared imagery, the operations including: evaluate an infrared image including a plurality of spectral response signatures of substances or chemical compounds within a field of view of the infrared image; receive input instructions corresponding to a substance or chemical compound to be located within an area of interest in the field of view of the infrared image; identify a presence of the substance or chemical compound to be located in the infrared image based, at least in part, on a match determination generated by the spectral response signatures of substances within the field of view compared to a library of known spectral response signatures; and record the presence of the substance to be located. This exemplary embodiment or another exemplary embodiment may further provide a platform carrying an infrared (IR) sensor in operative communication with the at least one non-transitory computer readable storage medium, wherein the IR sensor captures IR imagery data. In one particular embodiment, the system may not be tasking any sensors to capture IR imagery, but rather the system can exploit existing imagery containing IR spectral data to populate a database with that data and make it discoverable. This data will then be compared to an existing database of spectral signatures to determine what (and where) imagery containing that signature exist. The system may also have the capability to determine if something isn't present, which would be useful for environmental purposes, e.g. to see if a contaminant is not present. This exemplary embodiment or another exemplary embodiment may further provide a database including spectral response signatures of known substances, wherein the instructions, when executed, register the database with the IR imagery data to detect the presence of the substance or chemical compound to be determined. This exemplary embodiment or another exemplary embodiment may further provide a correlation function stored in the at least one non-transitory medium correlating the spectral response signatures in the IR imagery with the database to determine the substance or chemical compound based on the correlation. This exemplary embodiment or another exemplary embodiment may further provide wherein the platform carrying the IR sensor is a satellite. This exemplary embodiment or another exemplary embodiment may further provide a function stored in the at least one non-transitory computer readable storage medium to delineate between combinations of several spectral signatures and clutter in the IR imagery. This exemplary embodiment or another exemplary embodiment may further provide an optimization function stored in the at least one non-transitory computer readable storage medium to optimize a positive result indicative of the substance or chemical compound to be identified in the IR imagery. This exemplary embodiment or another exemplary embodiment may further provide wherein the substance or chemical compound is located at or near a ground surface within the field of view of IR imagery. This exemplary embodiment or another exemplary embodiment may further provide wherein the database is a self-referential table. This exemplary embodiment or another exemplary embodiment may further provide a report generated by the self-referential table, and the report including substances or chemical compounds detected.

In another aspect, an exemplary embodiment of the present disclosure may provide a method for detecting and identifying a substance comprising: receiving at least one infrared (IR) image containing metadata including spectral response signatures of substances or chemical compounds in the at least one IR image; storing the at least one IR image, at least temporarily, in a non-transitory computer readable storage medium; querying a substance or chemical compound to be identified in the at least one IR image in a database of known spectral response signatures; detecting and identifying the substance or chemical compound based, at least in part, on the spectral response signature contained in the metadata of the at least one IR image; and generating a report based on the detection and the identification of the substance or chemical compound. This exemplary embodiment or another exemplary embodiment may further provide wherein querying the substance or chemical compound in the database is accomplished by a self-referential table. This exemplary embodiment or another exemplary embodiment may further provide comparing at least one region within the IR image to the database of known spectral response signatures; transforming the metadata in the at least one image into an alert. This exemplary embodiment or another exemplary embodiment may further provide converting a detected and identified substance or chemical compound into a representative report of the substance or chemical compound on or near the ground as viewed by an IR sensor carried by a satellite. This exemplary embodiment or another exemplary embodiment may further provide selecting a region in the at least one IR image and determining a substance or chemical compound in the region by querying the database of known spectral signatures. This exemplary embodiment or another exemplary embodiment may further provide correlating a spectral response signature of the substances or chemical compounds in the at least one IR image; and generating, automatically, a list of all substances and chemical compounds in the at least one IR image based on the database of known spectral signature responses. This exemplary embodiment or another exemplary embodiment may further provide querying the database for an area of interest; and reporting results of substances in the area of interest. This exemplary embodiment or another exemplary embodiment may further provide wherein the results of substances in area of interest is reported via a computer implemented interactive interface.

In another aspect, an exemplary embodiment of the present disclosure may provide a system and method for detecting or identifying substances based on spectral response signatures. The system may utilize IR imagery, singularly or stored in a database, in operative communication with a database or library of known spectral response signatures. The system may correlate the spectral response signature detected, or inherent, in an image or image library, with the set of known signatures in the spectral database. The system may generate a report of the substances or chemical compounds present in at least a portion of the image. The system can also query a database of IR products for an area of interest, and return results in a report or via an interactive tool, for IR products containing specific IR spectral results.

BRIEF DESCRIPTION OF THE SEVERAL VIEWS OF THE DRAWINGS

Sample embodiments of the present disclosure are set forth in the following description, is shown in the drawings and is particularly and distinctly pointed out and set forth in the appended claims.

Similar numbers refer to similar parts throughout the drawings.

DETAILED DESCRIPTION

Figure 1:
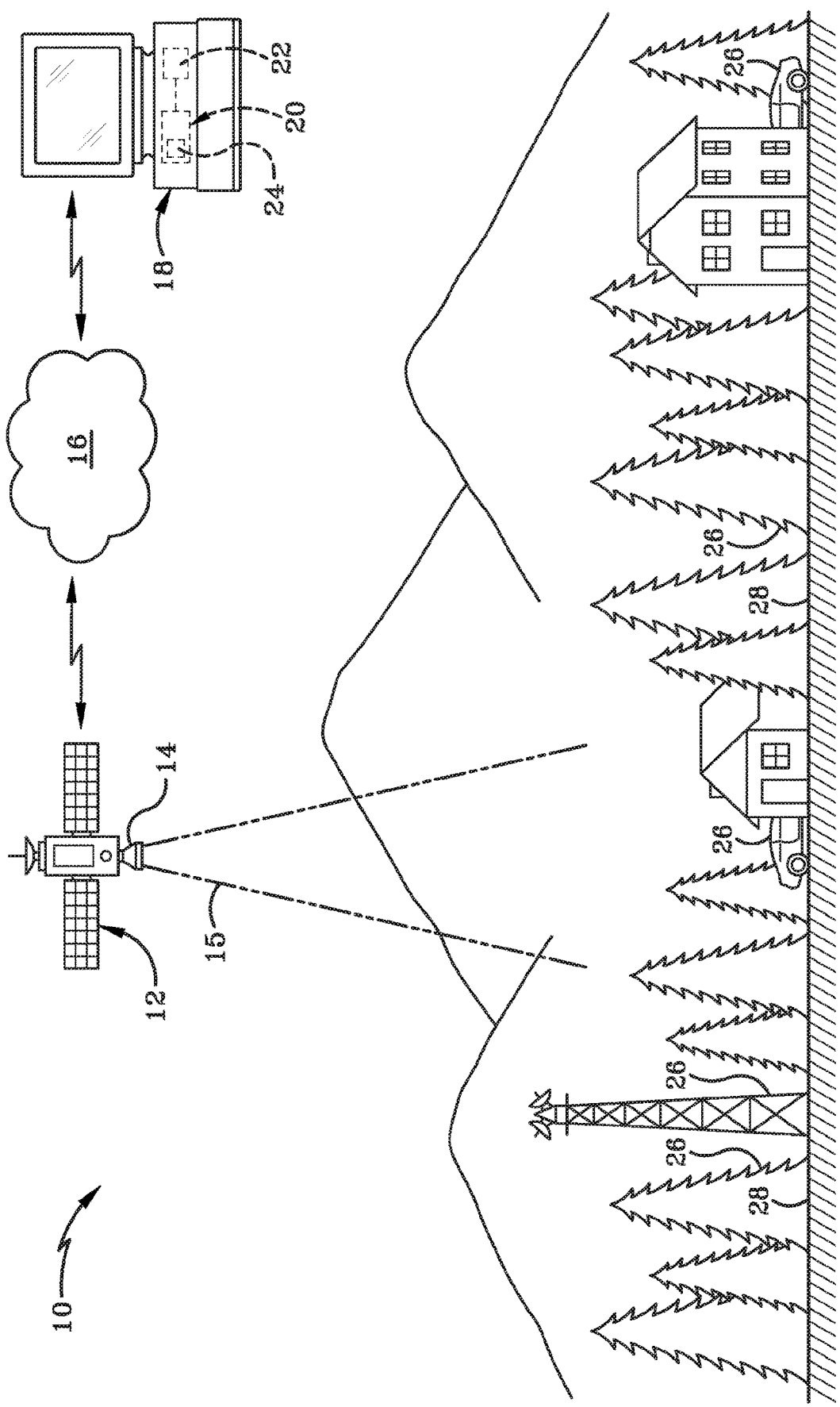
FIG. 1 (FIG. 1) is a diagrammatic view of an environment in which the system of the present disclosure operates.

FIG. 1 depicts an exemplary system in accordance, with the present disclosure to search and identify spectral signatures contained in metadata from images or imagery or to detect and identify a substance, object, or chemical compound on the ground. More particularly, FIG. 1 depicts a diagrammatic environmental view of a system 10 comprising a satellite 12 carrying an infrared or other image sensor 14 in operative communication with a network 16, and a computer 18 having at least one non-transitory computer readable storage medium 20 and at least one processor 22, and a database or library 24 stored or written or encoded in the memory 20. Additionally, a portion of the system 10 is configured to be positioned above a ground surface 26 having a plurality of substances or objects 28, either natural or manmade, positioned thereon. In accordance with one aspect of the present disclosure, the substances or objects 28 on the ground 26 are able to be detected by the system 10 by querying and identifying spectral signatures obtained from the sensor 14.

Satellite 12, which may also generally be referred to herein as a platform, is in high orbit above the ground 26. In one particular embodiment, the satellite 12 is orbiting the earth at a sufficient height so as to be above the earth's atmosphere. Furthermore, the platform does not need to be a satellite. The term platform can refer to any device that is able to carry the IR sensor 14. In one embodiment, the platform could be an aircraft, or it could alternatively be a space shuttle, or it could alternatively be any manned or unmanned aerial vehicle (UAV).

Sensor 14 carried by satellite 12 is a high power, high magnification sensor capable of capturing imagery data within a field of view 15. In one particular embodiment, sensor 14 is an infrared (IR) image sensor capturing IR images including at least eight bands of data within each image (however, there may be additional bands beyond the eight). An exemplary IR sensor is a thirty centimeter resolution panchromatic and eight-band and visible and near infrared (VNIR) image that collects short wave infrared (SWIR) imagery in eight bands. This allows the sensor 14 on the satellite 12 to sense the VNIR spectrum, as well expand deeper into the infrared spectrum. Sensor 14 provides rich data for precisely identifying and characterizing manmade and natural materials, chemicals, or substances. SWIR bands span the spectrum's three atmosphere transmittance imaging windows to capture unique information or materials identification. In one particular embodiment, the satellite may also have an image sensor 14 to capture 16 high-resolution spectral bands capturing information in the visible and near infrared (VIR) and SWIR properties when viewed in the infrared spectrum.

With continued reference to FIG. 1, the computer 20 is in operative communication with the network 16 in a known manner such as through wireless internet or a secured wireless connection. The network 16 establishes a wireless electrical communication between image sensor 14 and the computer 20. The network 16 allows data captured by the image sensor 14 to transfer to the at least on processor 22 and is in electrical communication with at least one non-transitory computer readable storage medium 20. More particularly, the processor 20 is in operative communication with the library 24. As will be described in greater detail below, the database 24 includes a plurality of spectral response signatures in the form of data and graphs, among other things, representative of known materials that may need to be identified. Additionally, the at least one non-transitory computer readable storage medium 20 has instructions encoded thereon, that when executed by the at least processor 22, implement operations to identify a material or object 26 at or near the ground surface 28 based on the spectral response signature or spectral graph of an area to be identified which is inherent in the metadata captured by the sensor 14.

Figure 2:
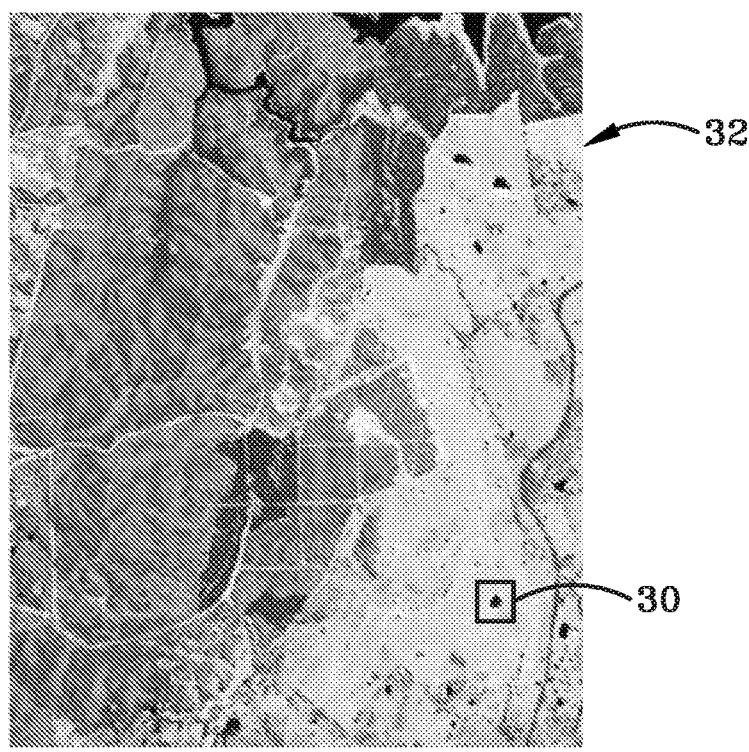
FIG. 2 (FIG. 2) is an exemplary infrared image captured by an infrared image sensor carried by a satellite.

FIG. 2 depicts an exemplary infrared image 32 captured by sensor 14 operating at a high altitude of the satellite 12. More particularly, a region to be identified, which is shown generally at 30 is an area of interest that the operator of system 10 desires to identify the material, substance, or chemical (or chemical compound), which are collectively understood to be objects 26, within the IR image 32.

Figure 3:
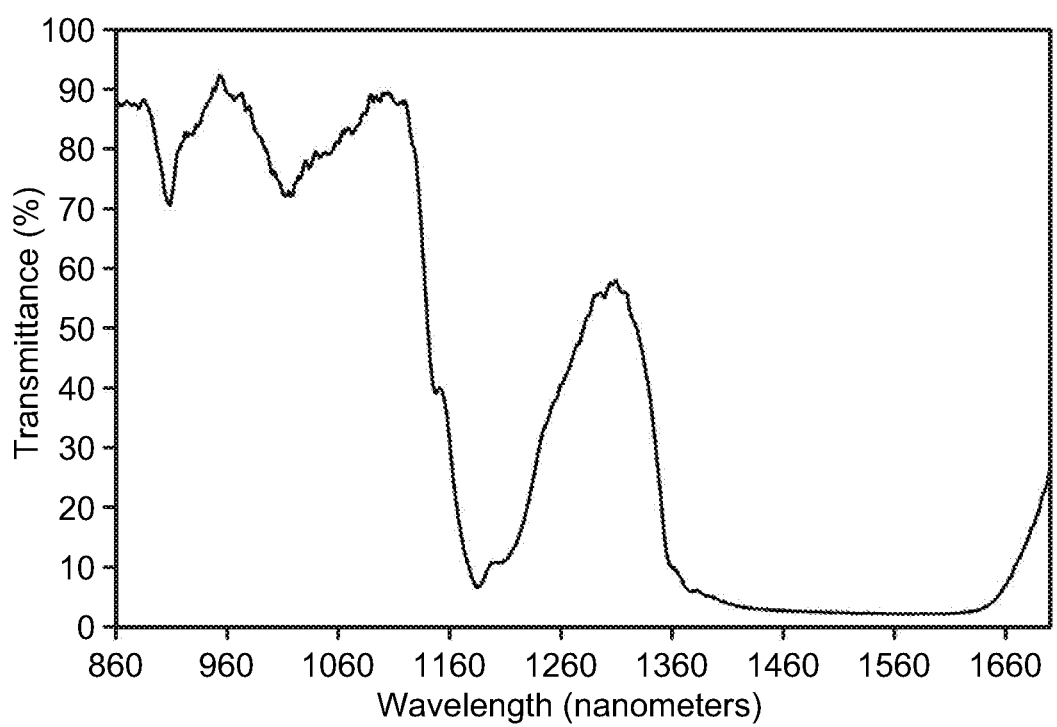
FIG. 3 (FIG. 3) is an exemplary spectral response graph.

In one particular embodiment, the system 10, more particularly, the instructions encoded on the memory 20 and the processor 22 are not examining the imagery product (see image of FIG. 3). In contradistinction, the system 10 extracts metadata from a large group of products including spectral data and geospatial data and populate the data into the database 24 for later query and discovery.

System 10 utilizes advanced algorithms, instructions, and processes to delineate between combinations of several spectral signatures and other clutter in order to deliver an optimized positive result or hypothesis percentage of accuracy for return results in identifying the substance or object 28 or materials, substances, or chemical compound(s) near the ground 26.

The computer 18 executes instructions stored in the memory 20 via processor 22 in order to query the metadata stored in the database 24. The query data may include additional data that is different than spectral data, such as geocoordinate data or keyword data. For example, data having mensurate information/data can detect an exact geo-location of the substance or chemical compound to be identified. Mensurate data refers to measuring accurately and precisely the position of an object.

Figure 4:
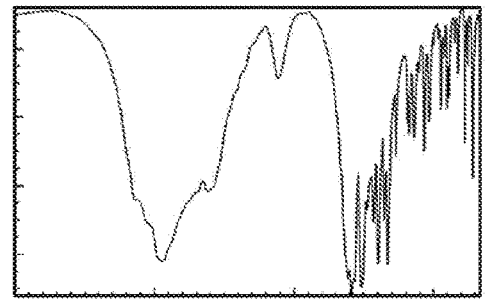
FIG. 4 (FIG. 4) is a plurality of spectral response graphs wherein the matching spectral response graph is identified by an asterisk.
Figure 4:
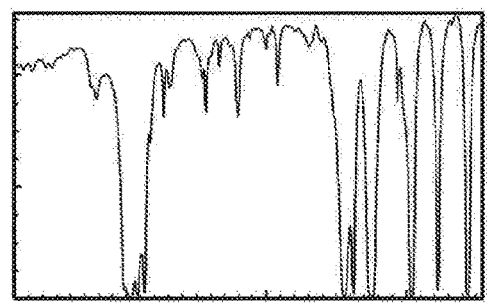
Figure 4:
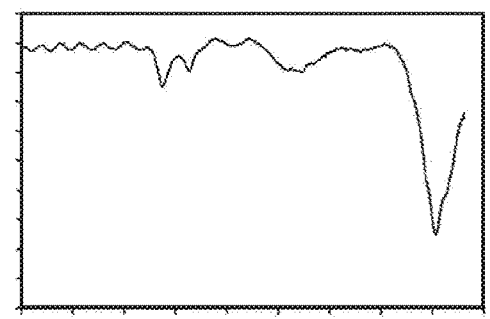
Figure 4:
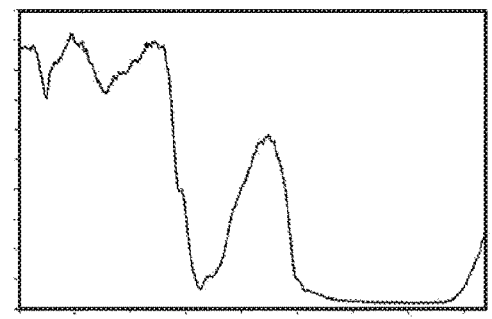
Figure 4:
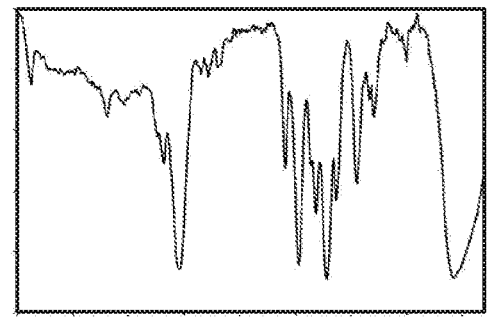

FIG. 3 and FIG. 4 depicts an exemplary operation of the present disclosure. More particularly, the region to be identified 30 present in the imagery data of FIG. 2 may result in a spectral graph as shown in FIG. 3. The spectral graph in FIG. 3 may reflect infrared properties of the material or chemical compound that can be queried against a database of known materials. A non-exhaustive and exemplary representation of the database materials is shown in FIG. 4. More particularly, the system determines when a match of materials reflects the spectral signature identified in the graph with a known material shown in the database. The asterisk symbol in FIG. 4 represents the match between the base material and the observed or identified spectral response graph in FIG. 3.

In one particular embodiment, a correlation function is utilized to correlate the observed spectral response graph (FIG. 3) from the substance/compound to be identified 30 in image 32 with the spectral response library or database of known signatures (FIG. 4). Furthermore, the correlation function can be further optimized to filter out additional criteria. For example, if the user (by way of input instructions to the system 10) desires to look for a substance that includes X and Y, the optimization function can apply a filter to remove all instances that include only X or only Y.

Once the system has determined that there is match between the observed material and the known material, the system may provide the results and record the same in a storage medium in order to provide the identified material to a storage device for later reading or interpretation by an operator or user.

The system 10 and method for detecting substances or chemicals using infrared spectral response provides improvements beyond its original technical field. More particularly, the improvements provided by the system 10 and method implemented thereof relate to an advance in the technical field of situational awareness, and the field of threat detection and countermeasure systems, more particularly, situational awareness systems. The system and method thereof provide additional specific, meaningful, and novel teachings to situational awareness systems beyond that what is well-understood, routine, or conventional in the situational awareness field. Additionally, it is to be understood that the system of the present disclosure pertains to a particular use with respect to infrared imagery obtained that is processed for the particular use described herein.

In accordance with another aspect of the present disclosure, the database or library 24 containing the spectral response signatures of known objects or substances or chemical compounds to be located may use a self-referential table for the computer database that improves the operation of the computer. The self-referential table in the database or library 24 may be associated with instructions or code to enable the table to reference itself without intervention of an operator. This can improve computer functionality by decreasing the amount of time needed to process the imagery data to detect and identify the substance/chemical compound (collective the objects 28) to be identified in the area of interest 30 in the image or images 32.

In another particular embodiment, the method of system 10 enables the computer to produce and generate a report of substances present in the image captured by the IR sensor that were not previously able to be accomplished without significant processing, computation, and effort. Thus, the system 10 and method implemented thereof of the present disclosure provide improvements in computer-centric or Internet-centric technology. In another particular embodiment, the memory 22 housed within the computer 20 in operable communication with the processor 24 can be implemented with different types of processors without sacrificing the efficiency of the system, thus, improving the overall computer memory and processing function to identify substances based on the spectral signatures from the IR images. Stated otherwise, the system and method of the present disclosure, which are encompassed by the appended claims, include elements that amount to significantly more than an abstract idea because they show an improvement in the functioning of the computer itself and also show an improvement to another technology/technical field (such as situational awareness, surveillance, intelligence, and countermeasure fields). More particularly, the system and method of the present disclosure recites additional steps of comparing regions within the IR imagery data to the spectral response table or library 26 to transform the imagery data into an alert or identification based systems that detects an object or chemical substance and then converting the positively identified object, substance, material or chemical compound into a representative report of the substance on or near the ground as viewed by the IR sensor. These additional steps tie some of the operation to the processor's ability to process the digital IR imagery. These steps add meaningful teachings to the concept of generating the IR imagery data and therefore add significantly more to the idea than mere computer implementation. The present disclosure, when taken as a whole, does not simply describe the generation of the IR imagery data via mathematical operations and receiving and storing data, but combines the steps of processing the IR imagery data with steps for determining substances on or near the ground based on the conversion of the IR imagery data and compares it with the spectral signature database. Accordingly, the present disclosure goes beyond the mere concept of retrieving and combining data using a computer.

By way of non-limiting example, some of the substances, or materials, or chemical compounds (collectively objects 28 near ground 26) that are conventionally known as hazardous substances that may be detected and identified by system 10 or by the method implementing the same include, but are not limited to, Acetone cyanohydrin, Acetone thiosemicarbazide, Acrolein, Acrylamide, Acrylonitrile, Acryloyl chloride, Adiponitrile, Aldicarb, Aldrin, Allyl alcohol, Allylamine, Aluminum phosphide, Aminopterin, Amiton, Amiton oxalate, Ammonia, Amphetamine, Aniline, Aniline, 2,4,6-trimethyl-, Antimony pentafluoride, Antimycin A, ANTU (Alpha-Naphthylthiourea), Arsenic pentoxide, Arsenous oxide, Arsenous trichloride, Arsine, Azidoazide azide, Azinphos-ethyl, Azinphos-methyl, Benzal chloride, Benzenamine 3-(trifluoromethyl), Benzenearsonic acid, Benzimidazole, 4,5-dichloro-2-(trifluoromethyl), Benzotrichloride, Benzyl chloride, Benzyl cyanide, Bicyclo(2.2.1)heptane-2-carbonitrile, Bis(chloromethyl) ketone, Bitoscanate, Boron trichloride, Boron trifluoride, Boron trifluoride compound with methyl ether (1:1), Bromadiolone, Bromine, Cadmium oxide, Cadmium stearate, Calcium arsenate, Camphechlor, Cantharidin, Carbachol chloride, Carbamic acid, Methyl-, O-(((2,4-Dimethyl-1,3-Dithiolan-2-yl)Methylene)Amino)-(Tirpate), Carbofuran, Carbon disulfide, Carbophenothion, Carfentanyl, Chlordane, Chlorfenvinfos, Chlorine, Chlorine trifluoride, Chlormephos, Chlormequat chloride, Chloroacetic acid, 2-chloroethanol, Chloroethyl chloroformate, Chloroform, Chloromethyl ether, Chloromethyl methyl ether, Chlorophacinone, Chloroxuron, Chlorthiophos, Chromic chloride, Cobalt carbonyl, Cobalt, (2,2'-(1,2-ethanediylbis)), Colchicine, Coumaphos, Cresol, -o, Crimidine, Crotonaldehyde, Crotonaldehyde, (E), Cyanide, Cyanogen bromide, Cyanogen iodide, Cyanophos, Cyanuric fluoride, Cycloheximide, Cyclohexylamine, Decaborane(14), Demeton, Demeton-S-methyl, Dialifor, Diborane, Dichloroethyl ether, Dichloromethylphenylsilane, Dichlorvos, Dicrotophos, Diepoxybutane, Diethyl chlorophosphate, Digitoxin, Diglycidyl ether, Digoxin, Dimefox, Dimethoate, Dimethyl mercury, Dimethyl phosphorochloridothioate, Dimethyl-p-phenylenediamine, Dimethylcadmium, Dimethyldichlorosilane, Dimethylhydrazine, Dimetilan, Dinitrocresol, Dinoseb, Dinoterb, Dioxathion, Diphacinone, Disulfoton; Dithiazanine iodide, Dithiobiuret, Endosulfan, Endothion, Endrin, Epichlorohydrin, EPN, or O-Ethyl-O-(4-nitrophenyl)phenylthiophosphonate, Ergocalciferol, Ergotamine tartrate, Ethanesulfonyl chloride, 2-chloro-, Ethanol, 1,2-dichloro-, acetate, Ethion, Ethoprophos, Ethylbis(2-chloroethyl)amine, Ethylene fluorohydrin, Ethylene oxide, Ethylenediamine, Ethyleneimine, Ethylthiocyanate, Fenamiphos, Fenitrothion, Fensulfothion, Fluenetil, Fluorine, Fluoroacetamide, Fluoroacetic acid, Fluoroacetyl chloride, Fluoroantimonic acid, Fluorouracil, Fonofos, Formaldehyde, Formaldehyde cyanohydrin, Formetanate hydrochloride, Formothion, Formparanate, Fosthietan, Fuberidazole, Furan, Gallium trichloride, Hexachiorocyclopentadiene, Hexamethylenediamine, N,N'-dibutyl-, Hydrazine, Hydrocyanic acid, Hydrogen chloride (gas only), Hydrogen cyanide, Hydrogen fluoride, Hydrogen peroxide (conc >52%), Hydrogen selenide, Hydrogen sulfide, Hydroquinone, Iron, pentacarbonyl-, lsobenzan, Isocyanic acid, 3,4-dichlorophenyl ester, Isodrin, Isophorone diisocyanate, Isopropylmethylpyrazolyl dimethylcarbamate, Lactonitrile, Leptophos, Lewisite, Lindane, Lithium hydride, Malononitrile, Manganese, tricarbonyl methylcyclopentadienyl, Mechlorethamine, Mercuric acetate, Mercuric chloride, Mercuric oxide, Methacrolein diacetate, Methacrylic anhydride, Methacrylonitrile, Methacryloyl chloride, Methacryloyloxyethyl isocyanate, Methamidophos, Methanesulfonyl fluoride, Methidathion, Methiocarb, Methomyl, Methoxyethylmercuric acetate, Methyl 2-chloroacrylate, Methyl bromide, Methyl chloroformate, Methyl hydrazine, Methyl isocyanate, Methyl isothiocyanate, Methyl phenkapton, Methyl phosphonic dichloride, Methyl thiocyanate, Methyl vinyl ketone, Methylmercuric dicyanamide, Methyltrichlorosilane, Metolcarb, Mevinphos, Mexacarbate, Mitomycin C, Monocrotophos, Muscimol, Mustard gas, Nickel carbonyl, Nicotine, Nicotine sulfate, Nitric oxide, Nitrobenzene, Nitrocyclohexane, Nitrogen dioxide, N-Nitrosodimethylamine, Norbormide, Organorhodium complex, Ouabain, Oxamyl, Oxetane, 3,3-bis(chloromethyl)-, Oxydisulfoton, Paraquat, Paraquat methosulfate, Parathion, Parathion-methyl, Paris green, Pentaborane, Pentadecylamine, Peracetic acid, Perchloromethylmercaptan, Phenol, Phenol, 2,2'-thiobis(4-chloro-6-methyl)-, Phenol, 3-(1-methylethyl)-, methylcarbamate, Phenoxarsine, 10,10'-oxydi-, Phenyl dichloroarsine, Phenylhydrazine hydrochloride, Phenylmercury acetate, Phenylsilatrane, Phenylthiourea, Phosacetim, Phosfolan, Phosgene, Phosmet, Phosphamidon, Phosphine, Phosphonothioic acid, methyl-, O-ethyl O-(4-(methylthio)phenyl) ester, Phosphonothioic acid, methyl-, S-(2-(bis(1-methylethyl)amino)ethyl) O-ethyl ester, Phosphonothioic acid, methyl-, O-(4-nitrophenyl) O-phenyl ester, Phosphoric acid, dimethyl 4-(methylthio)phenyl ester, Phosphonothioic acid, 0,0-dimethyl-S-(2-methylthio) ethyl ester, Phosphorus, Phosphorus oxychloride, Phosphorus pentachloride, Phosphorus trichloride, Physostigmine, Physostigmine, salicylate (1:1), Picrotoxin, Piperidine, Pirimifos-ethyl, Plutonium, Polonium-210, Potassium arsenite, Potassium cyanide, Potassium silver cyanide, Promecarb, Propargyl bromide, Propionitrile, Propionitrile, 3-chloro-, Propiophenone, 4'-amino-, Propyleneimine, Prothoate, Pyrene, Pyridine, 4-amino-, Pyridine, 4-nitro-, 1-oxide, Pyriminil, Ricin, Salcomine, Sarin, Selenious acid, Semicarbazide hydrochloride, Silane, (4-aminobutyl)diethoxymethyl-, Sodium arsenate, Sodium azide, Sodium cacodylate, Sodium cyanide, Sodium fluoroacetate, Sodium pentachlorophenate, Sodium selenite, Sodium selenite, Stannane, acetoxytriphenyl-, Strychnine, Strychnine sulfate, Sulfotep, Sulfoxide, 3-chloropropyl octyl, Sulfur dioxide, Sulfur mustard, Sulfur tetrafluoride, Sulfur trioxide, Sulfuric acid, Tabun, Tellurium, Tellurium hexafluoride, TEPP, Terbufos, Tetraethyllead, Tetraethyltin, Tetranitromethane, Thallium sulfate, Thallous carbonate, Thallous chloride, Thallous malonate, Thallous sulfate, Thioacetone, Thiocarbazide, Thiofanox, Thionazin, Thiophenol, Thiosemicarbazide, Thiourea, (2-chlorophenyl)-, Thiourea, (2-methylphenyl)-, Titanium tetrachloride, Toluene 2,4-diisocyanate, Toluene 2,6-diisocyanate, Trans-1,4-dichlorobutene, Triamiphos, Triazofos, Trichloro(chloromethyl)silane, Trichloro(dichlorophenyl)silane, Trichloroacetyl chloride, Trichloroethylsilane, Trichloronate, Trichlorophenylsilane, Triethoxysilane, Trimethylchlorosilane, Trimethylolpropane phosphite, Trimethyltin chloride, Triphenyltin chloride, Tris(2-chloroethyl)amine, Valinomycin, Vinyl acetate monomer, Warfarin, Warfarin sodium, Xylylene dichloride, and Zinc phosphide.

Although the system 10 is effective at detecting and identifying those hazardous substances/compounds listed above, the system can also detect substances/compounds (still collectively referred to as objects 28) that can have beneficial effects. Some other objects 28 that can be identified and detected through the spectral response data include manmade (artificial materials), such as, aluminum, asphalt, concrete, iron oxide, galvanized sheet metal, fiberglass, lead paint, plastics. Additionally, system 10 can identify and detect liquids/organic compounds/vegetation, cellulose, chlorophyll, methane, starch, trees and plants (many varieties), and other liquids such as water, red coated algae water, melting snow, seawater—costal combined with chlorophyll, seawater—open ocean, water and phyllosilicate (clay) mineral, frost, and other minerals such as magnetite/hematite/goethite—Iron Ore, and bauxite (gibbsite, diaspora)—Aluminum Ore.

System 10 contain thousands of IR Products or spectral response signatures and associated metadata, which can then be queried for by entering a compound (IR signature) and other criteria, such as a geographic point radius. An example would be looking for instances of any substance, such as any of the other substances listed above, within a range of some geo-coordinate. More particularly, if an operator desired to look for a swimming pool containing chlorine near a specific point, the operator could query the system to identify all instances of chlorine with a 3 km radius from the point in the IR image.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Figure 5:
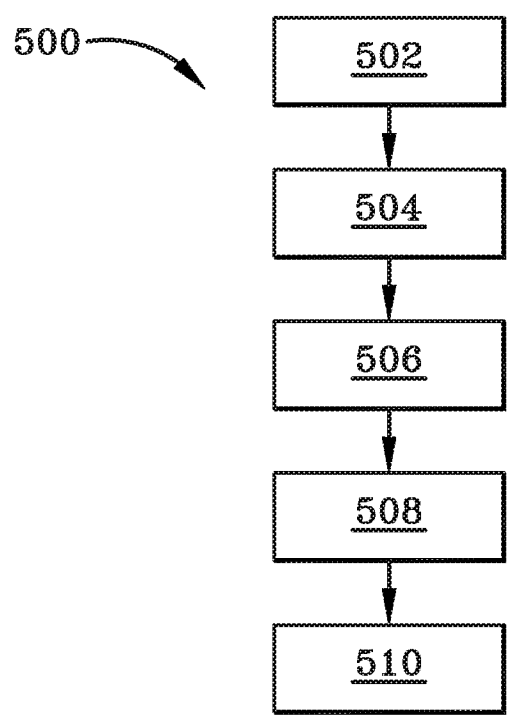
FIG. 5 (FIG. 5) is a flow chart representing an exemplary method or process in accordance with the present disclosure.

For example, FIG. 5 depicts an exemplary method for detecting and identifying a substance or chemical compound generally at 500. Method 500 may include receiving at least one infrared (IR) image containing metadata including spectral response signatures of substances or chemical compounds in the at least one IR image, which is shown generally at 502. Method 500 may include storing the at least one IR image, at least temporarily, in a non-transitory computer readable storage medium, which is shown generally at 504. Method 500 may include querying a substance or chemical compound to be identified in the at least one IR image in a database of known spectral response signatures, which is shown generally at 506. Method 500 may include detecting and identifying the substance or chemical compound based, at least in part, on the spectral response signature contained in the metadata of the at least one IR image, which is shown generally at 508. Method 500 may include generating a report based on the detection and the identification of the substance or chemical compound, which is shown generally at 510. Method 500 may further provide wherein querying the substance or chemical compound in the database is accomplished by a self-referential table. Additionally, the method 500 may provide comparing at least one region within the IR image to the database of known spectral response signatures; and transforming the metadata in the at least one image into an alert. Method 500 may also provide converting a detected and identified substance or chemical compound into a representative report of the substance or chemical compound on or near the ground as viewed by an IR sensor carried by a satellite. Method 500 may also provide selecting a region in the at least one IR image and determining a substance or chemical compound in the region by querying the database of known spectral signatures. Method 500 may also provide correlating a spectral response signature of the substances or chemical compounds in the at least one IR image; and generating, automatically, a list of all substances and chemical compounds in the at least one IR image based on the database of known spectral signature responses.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions stored in the memory 20 can be executed on any suitable processor or collection of processors 22, whether provided in a single computer 18 or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format. Collectively, these may be considered a computer implemented interactive interface. The computer implemented interactive interface may display the results of results of substances in area of interest after querying the database for an area of interest and reporting results of substances in the area of interest.

Such computers or smartphones may be interconnected by one or more networks (i.e., network 16) in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

The query function of the computer to identify the substances from the spectral response signature inherently contained in the metadata of the IR image may be accomplished by query logic contained in computer 18. "Logic", as used herein, includes but is not limited to hardware, firmware, software and/or combinations of each to perform a function (s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results.

The indefinite articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

The invention claimed is:

1. A system for detecting a substance from infrared imagery comprising:
at least one non-transitory computer readable storage medium having instructions encoded thereon that, when executed by at least one processor, implement operations to detect a substance or chemical compound from a spectral response signature contained in infrared (IR) imagery of a ground surface obtained from an infrared sensor operating on a platform above the ground surface, the operations including:
evaluate an infrared image including a plurality of spectral response signatures of substances or chemical compounds within a field of view of the infrared image;
query a substance or chemical compound to be located within an area of interest in the field of view of the infrared image;
identify a presence of the substance or chemical compound to be located in the infrared image based, at least in part, on a match determination generated by the spectral response signatures of substances within the field of view compared to a library of known spectral response signatures; and
record the presence of the substance to be located.

2. The system of claim 1, further comprising:
a database including spectral response signatures of known substances, wherein the instructions, when executed, register the database with the IR imagery data to detect the presence of the substance or chemical compound to be determined.

3. The system of claim 2, further comprising:
a correlation function stored in the at least one non-transitory medium correlating the spectral response signatures in the IR imagery with the database to determine the substance or chemical compound based on the correlation.

4. The system of claim 2, further comprising:
a function stored in the at least one non-transitory computer readable storage medium to delineate between combinations of several spectral signatures and clutter in the IR imagery.

5. The system of claim 4, further comprising:
an optimization function stored in the at least one non-transitory computer readable storage medium to optimize a positive result indicative of the substance or chemical compound to be identified in the IR imagery.

6. The system of claim 2, wherein the database is a self-referential table.

7. The system of claim 6, further comprising:
a report generated by the self-referential table, and the report including substances or chemical compounds detected.

8. The system of claim 1, wherein the platform carrying the IR sensor is a satellite.

9. The system of claim 1, wherein the substance or chemical compound is located at or near the ground surface within the field of view of IR imagery.

10. The system of claim 1, further comprising providing mensurate data with a geolocation of the substance or chemical compound to be identified.

11. The system of claim 1, wherein the IR imagery comprises at least eight bands of data within each image.

12. The system of claim 1, wherein the platform is in a high orbit above the ground surface.

13. A method for detecting and identifying a substance comprising:
- receiving at least one infrared (IR) image containing metadata including spectral response signatures of substances or chemical compounds in the at least one IR image, wherein the IR image is of a ground surface obtained from an IR sensor operating on a platform above the ground surface;
- storing the at least one IR image, at least temporarily, in a non-transitory computer readable storage medium;
- querying at least one substance or chemical compound to be identified in the at least one IR image in a database of known spectral response signatures;
- detecting and identifying the substance or chemical compound based, at least in part, on the spectral response signature contained in the metadata of the at least one IR image; and
- generating a report based on the detection and the identification of the substance or chemical compound.

14. The method of claim 13, wherein querying the substance or chemical compound in the database is accomplished by a self-referential table.

15. The method of claim 13, further comprising:
- comparing at least one region within the IR image to the database of known spectral response signatures; and
- transforming the metadata in the at least one image into an alert.

16. The method of claim 13, further comprising:
- converting a detected and identified substance or chemical compound into a representative report of the substance or chemical compound on or near the ground surface as viewed by the IR sensor carried by a satellite.

17. The method of claim 13, further comprising:
- selecting a region in the at least one IR image and determining the substance or chemical compound in the region by querying the database of known spectral signatures.

18. The method of claim 13, further comprising:
- correlating a spectral response signature of the substance or chemical compound in the at least one IR image; and
- generating, automatically, a list of all substances and chemical compounds in the at least one IR image based on the database of known spectral signature responses.

19. The method of claim 13, further comprising:
- querying the database for an area of interest;
- reporting results of substances in the area of interest.

20. The method of claim 19, wherein the results of substances in area of interest is reported via a computer implemented interactive interface.

* * * * *